Nov. 21, 1972    L. W. NIEDRACH ET AL    3,703,457
SENSOR WITH ANION EXCHANGE RESIN ELECTROLYTE
Filed Oct. 15, 1970
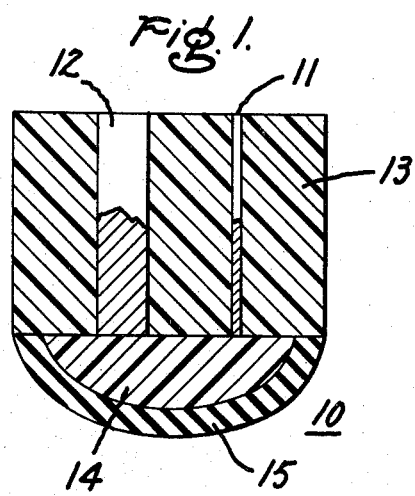
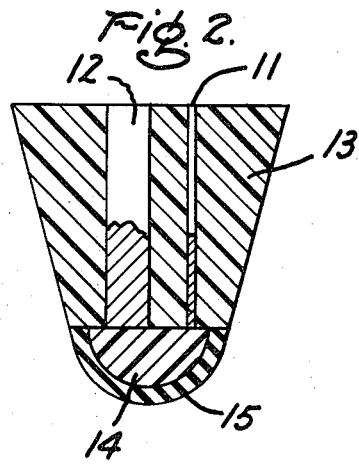
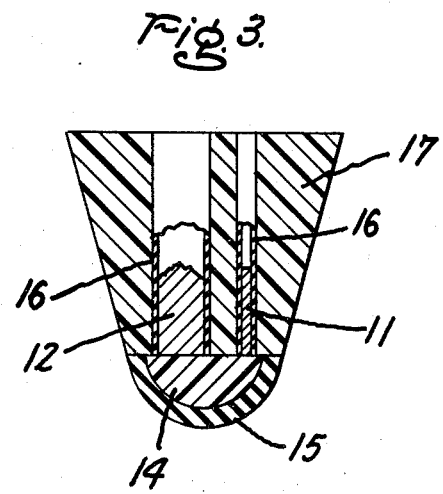
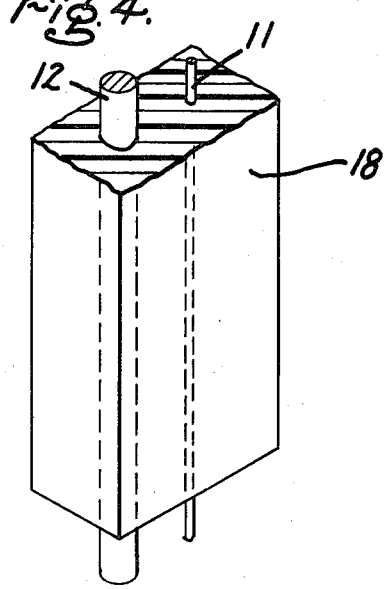
Inventors:
Leonard W. Niedrach,
William N. Stoddard, Jr.,
by Paul R. Webb, II
Their Attorney.

United States Patent Office 3,703,457
Patented Nov. 21, 1972

3,703,457
SENSOR WITH ANION EXCHANGE RESIN
ELECTROLYTE
Leonard W. Niedrach and William H. Stoddard, Jr.,
Schenectady, N.Y., assignors to General Electric Company
Filed Oct. 15, 1970, Ser. No. 80,902
Int. Cl. G01n 27/46
U.S. Cl. 204—195 P
4 Claims

ABSTRACT OF THE DISCLOSURE

A sensor has a rigid electrically insulating matrix, at least a pair of generally parallel, elongated electrodes embedded in the matrix, the electrodes electrically insulated from each other by the matrix material and opposite ends exposed, an anion exchange resin electrolyte contacting the exposed ends of the electrodes at one end of the matrix and an outer sheath of diffusion barrier material encapsulating at least the electrodes and the electrolyte. Methods of manufacturing such sensors are also described.

---

Reference is made to copending patent application entitled "Sensor and Method of Making" filed Sept. 4, 1970, and given Ser. No. 69,650, which describes and claims a sensor including an ion exchange resin electrolyte and methods of manufacture. This copending application, in the name of Leonard W. Niedrach, is assigned to the same assignee as the present application.

This invention relates to sensors and to methods of manufacturing such sensors and, more particularly, to polarographic oxygen sensors employing a rigid matrix and to methods of manufacturing such sensors.

Sensors are employed to determine the content of a specific substance in a fluid atmosphere. For example, a sensor might be employed to determine the content of oxygen, or carbon dioxide in a sample, or its pH.

Polarographic oxygen sensors are known in the prior art for determining oxygen content of a sample. In operation, such a sensor determines the transfer rate of oxygen through a diffusion barrier by measuring the related limiting reduction current at a polarized electrode. U.S. Letters Patent describing such sensors include No. 2,913,386, Clark, issued Nov. 17, 1959 for "Electrochemical Device for Chemical Analysis," No. 3,415,730, Haddad, issued Dec. 10, 1968 for "Flexible Electrode Assembly" and No. 3,449,231, Adams et al., issued June 10, 1969, for "Oxygen Sensor with Rhodium Cathode."

Our present invention is directed to an improved miniaturized sensor which is suitable for biomedical, environmental control and other applications.

The primary objects of our invention are to provide a rugged, accurate miniaturized sensor and method of manufacture.

In accordance with one aspect of our invention, a sensor comprises a rigid electrically insulating matrix, at least a pair of generally parallel, elongated electrodes embedded in the matrix, the electrodes electrically insulated from each other by the martix and opposite ends exposed, an anion exchange resin electrolyte contacting the exposed ends of the electrodes at one end of the matrix, and an outer sheath of oxygen diffusion barrier material encapsulating the electrodes and the electrolyte.

These and various other objects, features and advantages of the invention will be better understood from the following description taken in connection with the accompanying drawing in which:

FIG. 1 is a sectional view of a portion of a polarographic oxygen sensor made in accordance with our invention;

FIG. 2 is a sectional view of a portion of a modified sensor;

FIG. 3 is a sectional view of a portion of another modified sensor; and

FIG. 4 is a perspective view of a rigid matrix block employed in one method of our invention.

In FIG. 1 of the drawing, there is shown generally at 10 a portion of a sensor embodying our invention. Sensor 10 is shown with a first electrode or cathode 11 in the form of a 1 mil silver wire and a second electrode or counter electrode 12 in the form of a 25 mil cadmium wire. These electrodes, which form a pair of elongated electrodes which are generally parallel and spaced apart, are embedded in a rigid matrix 13 of a material such as a cured epoxy resin. In this figure, matrix 12 insulates electrically one electrode from the other electrode while the opposite ends of the electrodes are exposed.

An anion exchange resin electrolyte 14 of quaternized polystyrene in its bicarbonate form contacts both electrodes 11 and 12 at one of their exposed ends. An outer sheath 15 of oxygen diffusion barrier material of Viton hexafluoropropylene-vinylidene fluoride rubber encapsulates electrodes 11 and 12, and electrolyte 14. If a sufficiently active metal is employed self-powered operation is possible by connection to an appropriate value resistance with an ammeter in series connected to the opposite exposed ends of the respective electrodes. Otherwise, it is necessary to provide a driving potential in the form of a battery or other power supply. The resulting polarographic oxygen sensor can be used for clinical or other analysis. The electrical output from the sensor in operation will be a linear function of the oxygen partial pressure of the environment.

In FIG. 2 of the drawing, there is shown a portion of a modified polarographic oxygen sensor which is generally similar to the sensor described above for FIG. 1. However, matrix 13, which is contacted by electrolyte 14 and encapsulated by outer sheath 15, is tapered inwardly. In this configuration, matrix 13 fits into a tapered joint (not shown) for further easy assembly into a suitable holder or sample container.

In FIG. 3 of the drawing, there is shown a portion of a further modified polarographic oxygen sensor which is generally similar to the sensor described above in FIG. 1. The pair of generally parallel wires are embedded in a preformed rigid electrically insulating matrix 17 which has appropriate openings therein. A suitable binder 16 such as an epoxy resin is applied to seal each electrode into its respective opening in matrix 17.

In FIG. 4 of the drawing there is shown a rigid matrix block 18 in which at least a pair of electrodes 11 and 12 are embedded in a generally parallel relationship. This block can be sliced and if necessary the slices shaped to provide a number of matrices like 13 of FIGS. 1 and 2 or 17 of FIG. 3.

We found that we can form improved sensors, and particularly, the above described polarographic oxygen sensors by a unique method of embedding at least a pair of generally parallel, elongated electrodes in a curable electrically insulating matrix material and curing the matrix material to form a rigid matrix block in which the electrodes are electrically insulated from each other. The matrix block can then be sliced to provide a number of sensor matrices, each with the opposite electrode ends exposed. Individual sensor matrices also can be formed by embedding a pair of generally parallel elongated electrodes directly in a curable matrix material.

We found further that we can embed such a pair of generally parallel, elongated electrodes in a preformed electrically insulating matrix with respective electrode openings therein by using a suitable adhesive such as an epoxy resin to seal the wires in the openings.

An anion exchange resin electrolyte is applied at one end of the matrix thereby contacting the exposed electrode ends. An outer sheath of diffusion barrier material is applied thereby encapsulating at least the electrodes and the electrolyte.

We found that polymer resins for producing composites of fibers and polymer binder can be used in our method which resins are of suitable resistance to chemical attack, possess metal wetting characteristics, etc. Such suitable polymer resin binders include epoxys, polyimides, polyesters, etc.

We found that a suitable sensing or cathode electrode can be made of silver, gold, platinum or other noble metals. The counter electrode can be made of a wide variety of base metals that can be electrochemically oxidized, such as copper, iron, nickel, lead, cadmium, etc. It is preferred that the diameter of the counter electrode be in a ratio of at least 10 to 1 to the diameter of sensing electrode to effectively limit anode polarization. If the electrodes are sealed in the matrix with a binder, various materials for this purpose can be used such as epoxy resins, alkyd resins, polystyrene, etc.

We found further that the above sensors can employ an anion exchange resin electrolyte preferably in a buffered, neutral form or in the form of a strong base.

Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application.

With this anion exchange resin type sensor, suitable electrolytes include a terpolymer of methyl methacrylate, divinylbenzene and 2-hydroxy-3-trimethylammonium propyl methacrylate, and quaternized polystyrene. Of the anion exchange resin electrolytes we prefer quaternized polystyrene in the bicarbonate form.

A quaternized polystyrene is a polystyrene which is partially converted to a quaternary amine derivative. The manufacture of this electrolyte involves the chloromethylation and subsequent quaternization of polystyrene as shown in Equation 1.

Equation 1

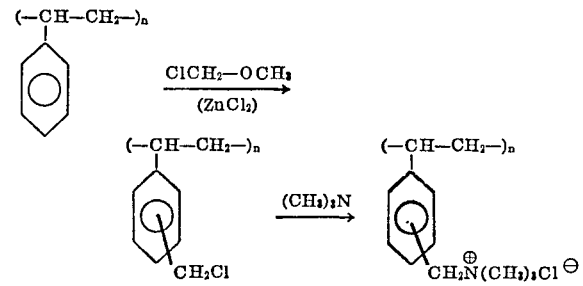

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain values which correspond to optimal chlorine contents of 3.6–4.2% for the chloromethylated but not quaternized resin, about 1 chloromethyl group for every 8 repeat units, with the wider tolerance of 3.3–4.5% Cl for a satisfactory product. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No crosslinking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20% water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation 2.

Equation 2

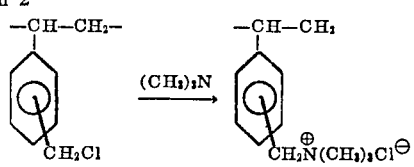

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20% solution in methanol. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C. in vacuo.

We found that various diffusion barrier materials are suitable as an outer sheath to encapsulate the electrodes and the electrolyte. The diffusion barrier material must be electrically insulating and have an appropriate permeability coefficient for the particular substance, such as oxygen, to be sensed. Suitable materials include polypropylene oxide, Viton hexafluoropropylene-vinylidene fluoride rubber, Adiprene urethane rubber, silicone rubbers, etc.

We found that after the above-described matrix block is sliced to provide a sensor matrix, or an individual sensor matrix is formed, or a preformed matrix with electrodes is provided, an ion exchange resin electrolyte can be applied to one end of the martix thereby contacting the exposed electrode ends. This can be accomplished by contacting one end of the matrix with an electrolyte solution such as a solution of quaternized polystyrene in chloroform-methanol and then removing the solvent. This forms ion exchange resin electrolyte 14 which is subsequently converted to the bicarbonate form by immersing in a dilute bicarbonate solution. After the anion exchange electrolyte has had sufficient time to equilibrate, which normally requires a period of at least 30 minutes, the device is then rinsed briefly in water and partially dried in a flowing nitrogen atmosphere. An outer sheath of Viton rubber, an oxygen diffusion barrier material with electrical insulation properties, is applied over electrolyte 14 and electrodes 11 and 12 by immersion in a Viton solution in acetone and then allowing the acetone solvent to evaporate in ambient air.

The resulting polarographic oxygen sensor can be used for clinical or other analysis. An appropriate resistance with an ammeter and power supply, if necessary, in series is connected to the respective electrodes. The electrical output from the sensor in operation will be a linear function of the oxygen partial pressure of the environment.

Examples of polarographic oxygen sensors made in accordance with our invention are as follows:

EXAMPLE 1

A polarographic oxygen sensor was formed in accordance with the above description and in the form shown in FIG. 1 of the drawing. A 30 mil thick nickel wire and a 1 mil thick silver wire, the respective electrodes, were embedded in an epoxy resin of D.E.R. 332 which is manufactured by Dow Chemical Company, Midland, Mich. During the casting operation, the respective ends of the wire were held by fittings outside the epoxy mixture to provide general parallelism between the respective wires. The resin was allowed to cure overnight at room temperature. The resulting structure was a rigid matrix with dimensions of 3/16 inch diameter by 3 inches long. The electrodes were spaced apart approximately 0.010 inch. The working end was ground flat. The opposite ends of both electrodes were exposed. The working end of the matrix was immersed into a chloroform-methanol solution of quaternized polystyrene in the chloride form having an ion exchange capacity of one milliequivalent per gram. The electrolyte was then converted to a bicarbonate form. The conversion of the electrolyte was accomplished by immersing the structure in a dilute potassium bicarbonate solution overnight. The resulting structure was a polarographic oxygen sensor except that the oxygen diffusion barrier material had not been applied.

EXAMPLE 2

The polarographic oxygen sensor made in accordance with Example 1 above was tested by being continued in its potassium bicarbonate solution. A stream of oxygen gas kept the solution saturated with oxygen. The temperature of the solution was maintained at 25° C. The electrical output was about 1.3 picoamperes per millimeter of oxygen.

EXAMPLE 3

A polarographic oxygen sensor was formed in accordance with the above description and in a form analogous to FIG. 3 of the drawing. A 25 mil thick cadmium wire and a 1 mil thick silver wire, the respective electrodes were positioned in the parallel bores of a quartz double bore thermocouple insulator. These parallel bores were then filled with an epoxy resin of D.E.R. 332 which is manufactured by Dow Chemical Company, Midland, Mich. The resin was allowed to cure overnight at room temperature. The resulting structure was a rigid matrix of quartz with dimensions of .15 inch diameter by 5 inches long, the respective wires being generally parallel and spaced .05 inch apart from each other, bonded to the quartz by means of the epoxy resin. The working end was ground flat. The opposite ends of both electrodes were exposed. The working end of the matrix was contacted with a chloroform-methanol solution of quaternized polystyrene in the chloride form having an ion exchange capacity of one milliequivalent per gram. After removal of the solvent by heating in flowing nitrogen for 30 minutes the electrolyte was then converted to a bicarbonate form. The conversion of the electrolyte was accomplished by immersing the structure in a 0.1 M solution of potassium bicarbonate overnight. The structure was then rinsed of excess potassium bicarbonate solution by immersing in distilled water briefly. It was then dried for five minutes at 25° C. in an air atmosphere, whereupon it was immersed in a 25 weight percent solution of Viton hexafluoropropylene-vinylidene fluoride rubber in acetone. The structure was then removed from the rubber solution and the oxygen diffusion barrier was formed by removing solvent by evaporation for 30 minutes in air at 25° C. It was then placed in 0.1 M potassium bicarbonate solution overnight to replace water lost in the above drying steps. The now completed structure is a polarographic oxygen sensor.

EXAMPLE 4

The polarographic oxygen sensor made in accordance with Example 1 above was tested by being continued in its potassium bicarbonate solution. A stream of oxygen-containing gas kept the solution saturated with the desired partial pressure of oxygen. The temperature of the solution was maintained at 25° C. With the sensing electrode biased to −.4 volt versus the counter electrode the electrical output of the sensor was 3.8 picoamperes per millimeter of oxygen.

While other modifications of the invention and variations thereof which may be embraced within the scope of the invention have not been described, the invention is intended to include such as may be embraced within the following claims.

What we claim as new and desire to secure by Letters Patent of the United States is:

1. A sensor comprising a rigid electrically insulating matrix, at least a pair of generally parallel, elongated electrodes embedded in the matrix and spaced apart, the electrodes being electrically insulated from each other by the matrix and having opposite ends exposed, one end of the matrix is tapered inwardly, an anion exchange resin electrolyte contacting one exposed end of each of the electrodes at the tapered end of the matrix, and an outer sheath of diffusion barrier material encapsulating at least the electrodes and the electrolyte.

2. A sensor comprising a rigid electrically insulating matrix, at least a pair of generally parallel, elongated electrodes embedded in the matrix and spaced apart, one electrode is a base metal, the other electrode is a noble metal, the base metal electrode has a greater diameter than the noble metal electrode, the electrodes being electrically insulated from each other by the matrix and having opposite ends exposed, an anion exchange resin electrolyte contacting one exposed end of each of the electrodes at one end of the matrix, and an outer sheath of diffusion barrier material encapsulating at least the electrodes and the electrolyte.

3. In a polarographic oxygen sensor as in claim 2, in which one electrode is nickel, the other electrode is silver, the nickel electrode has a greater diameter than the silver electrode, the electrolyte is quaternized polystyrene in its bicarbonate form, and the outer sheath is an oxygen diffusion barrier of hexafluoropropylene-vinylidene fluoride rubber.

4. In a polarographic oxygen sensor as in claim 2, in which one electrode is cadmium, the other electrode is silver, the cadmium electrode has a greater diameter than the silver electrode, the electrolyte is quaternized polysytrene in its bicarbonate form, and the outer sheath is an oxygen diffusion barrier of hexafluoropropylene-vinylidene fluoride rubber.

References Cited

UNITED STATES PATENTS

| | | | |
|---|---|---|---|
| 2,913,386 | 11/1959 | Clark | 204—195 |
| 3,071,530 | 1/1963 | Neville | 204—195 |
| 3,134,697 | 5/1964 | Niedrach | 136—86 F |
| 3,227,643 | 1/1966 | Okun et al. | 204—195 |
| 3,382,105 | 5/1968 | McBryer et al. | 136—86 F |
| 3,415,730 | 12/1968 | Haddad | 204—195 |

TA HSUNG TUNG, Primary Examiner

U.S. Cl. X.R.

117—232